Aug. 4, 1931.   N. J. POUX   1,817,841
SEPARABLE FASTENER
Filed Sept. 30, 1929
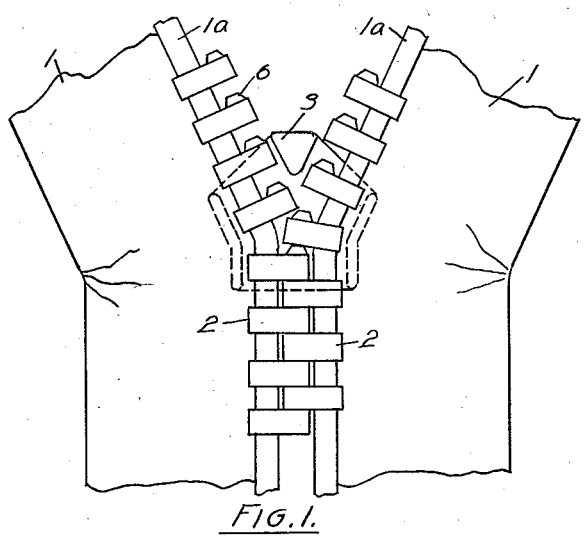
FIG.1.
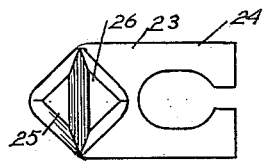
FIG.9.
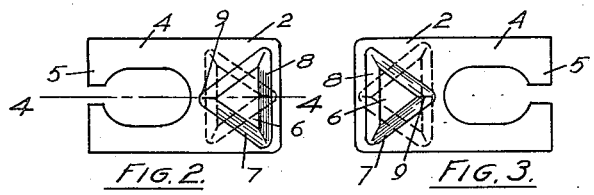
FIG.2.   FIG.3.
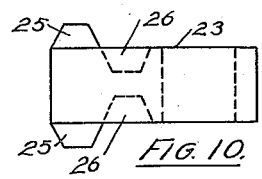
FIG.10.
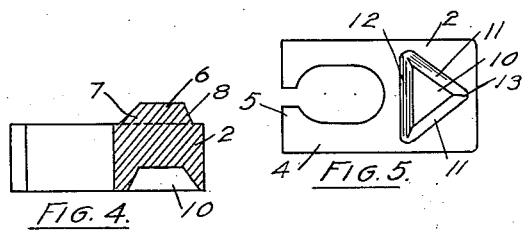
FIG.4.   FIG.5.   FIG.6.
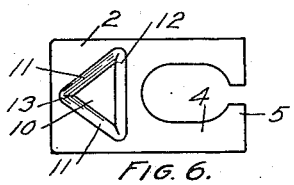
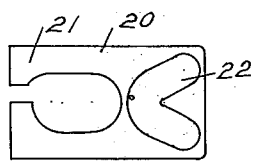
FIG.8.
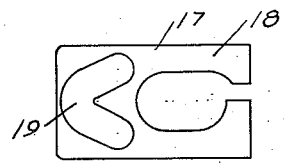
FIG.7.
Noel J. Poux
INVENTOR.
BY N. L. Lord
ATTORNEYS.

Patented Aug. 4, 1931

1,817,841

UNITED STATES PATENT OFFICE

NOEL J. POUX, OF MEADVILLE, PENNSYLVANIA, ASSIGNOR TO LION FASTENER INC., OF MEADVILLE, PENNSYLVANIA, A CORPORATION OF DELAWARE

SEPARABLE FASTENER

Application filed September 30, 1929. Serial No. 396,180.

Separable fasteners of the type brought into interlocking engagement by swinging the fasteners successively into place are usually insecure if the opposing series are flexed out of the plane of the stringers to which they are attached. The present invention is designed to obviate this by limiting the swinging movement of the fastening members relatively to each other. This limiting of the flexure may be accomplished by forming the interlocking projections and recesses with three sides as distinguished from a greater number of sides which more nearly approach the round, or non-locking structure. It is also desirable to form the members of a separable fastener so that all the members will be interchangeable and with the present invention this is accomplished. Features and details of the invention will appear from the specification and claims.

A preferred embodiment of the invention is illustrated in the accompanying drawings as follows:—

Fig. 1 shows an elevation of the fastener.
Fig. 2 a plan view of one of the fastening members.
Fig. 3 an opposing fastening member.
Fig. 4 a sectional view taken on the line 4—4 in Fig. 2.
Fig. 5 a plan view of the reverse side of the member shown in Fig. 2.
Fig. 6 a reverse side of the member shown in Fig. 3.
Fig. 7 a plan view of an alternative construction.
Fig. 8 a plan view of a further modification.
Fig. 9 a plan view of a modification.
Fig. 10 an edge elevation of the structure shown in Fig. 9.

1 marks the stringers, 1a ribs along the edges of the stringers, 2 interlocking members, and 3 the slider for closing and separating the members.

The member 2 has jaws 4 with inturned ends 5 for clamping the ribs along the edges of the stringers. Each member 2 has a three-sided projection 6 on one face of the member. This projection has the inclined side walls 7, one of the walls 8 being adjacent and parallel to the free end of the member, the other converging side walls meeting at 9 at a point remote from the free end of the member. The reverse side of each member has a recess 10 similar in shape and adapted to receive the projections, but with the sides 11 reversed, or out of register with the projection on the opposite face of the same member. Thus the side 12 of the recess parallel to the free end of the member is remote from said end, whereas the apex of the triangle is at 13 adjacent to the free end. In this way it is possible to form the members of exactly the same shape so that they may all be interchangeable and applicable to either series. It will be noted that the projection 6 in either one, as viewed in Figs. 2 and 3 will nest in a recess of the opposing series of members, said recesses being indicated in dotted lines. In this way it is possible to obtain the advantages of the three-sided structure which more securely locks the members against flexure out of the plane of the stringers and at the same time forms all the members alike.

The modification shown in Fig. 7 has the interlocking member 17 with jaws 18 and the three-sided interlocking member has one side indented giving a completed V-shaped projection 19 with the apex adjacent to the free end of the member. The recesses (not shown) are, of course, reversed.

Fig. 8 a somewhat similar structure is shown, the member 20 having clamping jaws 21 and V-shaped projections 22 with the apex remote from the free end of the member.

In Figs. 9 and 10 a modification is shown in which the member 23 has clamping jaws 24 and the members are provided with the three-sided projections 25 with three-sided recesses 26 behind the three-sided projections. It will be noted that the recesses and projections are similarly arranged on both faces of each member so that there is a double locking effect and the devices are interchangeable.

What I claim as new is:—

1. A separable fastener comprising opposing series of interlocking members adapted to swing into interlocking position, each member having a three-sided projection and a three-sided recess adapted to receive a similar projection of an opposing series the three side walls of the projection confronting the three side walls of the recess receiving the projection, said members of the opposing series having their projections and recesses arranged in the same relation to the free ends of the members, the members of both series being interchangeable.

2. A separable fastener comprising opposing series of interlocking members adapted to swing into interlocking position, each member having a three-sided projection on one face of the member and a three-sided recess on the reverse face of the member, the walls of said recess and projection being in reverse relation and the recesses of one series being adapted to receive the projections of the other series, the three side walls of the projection confronting the three side walls of the recess receiving the projection.

3. A separable fastener comprising opposing series of interlocking members adapted to swing into interlocking position, each member having a three-sided projection on one face of the member and a three-sided recess on the reverse face of the member, one side only of the projection being parallel with a side of the recess, said parallel sides of the projection and recess being parallel to the free end of the member and the recesses of one series being adapted to receive the projections of the other series, the sides of the projections and the recesses of the members of both series having the same relation to the ends of the members, the members of both series being interchangeable and the three side walls of the projection of each member confronting the three side walls of the recess receiving the projection.

4. A separable fastener comprising opposing series of interlocking members adapted to swing into interlocking position, each member having a three-sided projection on one face of the member and a three-sided recess on the reverse side of the member, one side only of the projection being parallel with a side of the recess, the parallel side of the projection being adjacent to the free end of the member and the recesses of one series being adapted to receive the projections of the other series, the three side walls of the projection engaging the three side walls of the recess receiving the projection.

5. A separable fastener comprising opposing series of interlocking members adapted to swing into and out of interlocking engagement, each member having a polygonally shaped projection on one face and a similar polygonally shaped recess on the opposite face, the recesses of the members of one series being adapted to receive the projections of the opposing series and the members of both series being interchangeable, each side of the projection being out of parallel with a side of the recess directly opposite the side of the projection and each side of the projection confronting a side of the recess receiving the projection.

In testimony whereof I have hereunto set my hand.

NOEL J. POUX.